United States Patent
Weimer

(10) Patent No.: US 9,611,346 B2
(45) Date of Patent: Apr. 4, 2017

(54) HIGHLY CROSSLINKED POLYMER DIELECTRIC FILMS FOR IMPROVED CAPACITOR PERFORMANCE

(71) Applicant: Brewer Science Inc., Rolla, MO (US)

(72) Inventor: Marc Weimer, Rolla, MO (US)

(73) Assignee: Brewer Science Inc., Rolla, MO (US)

( * ) Notice: Subject to any disclaimer, the term of this patent is extended or adjusted under 35 U.S.C. 154(b) by 197 days.

(21) Appl. No.: 14/292,349

(22) Filed: May 30, 2014

(65) Prior Publication Data

US 2014/0362493 A1    Dec. 11, 2014

Related U.S. Application Data

(60) Provisional application No. 61/831,672, filed on Jun. 6, 2013.

(51) Int. Cl.
    *C08G 12/00*      (2006.01)
    *C08F 120/58*      (2006.01)
    *H01G 4/32*      (2006.01)
    *H01G 4/18*      (2006.01)

(52) U.S. Cl.
CPC ............. *C08F 120/58* (2013.01); *H01G 4/18* (2013.01); *H01G 4/32* (2013.01); *Y10T 428/31855* (2015.04)

(58) Field of Classification Search
None
See application file for complete search history.

(56) References Cited

U.S. PATENT DOCUMENTS

| | | | | |
|---|---|---|---|---|
| 5,294,671 A | * | 3/1994 | Szita | ............... C07D 251/70 427/385.5 |
| 2003/0207062 A1 | * | 11/2003 | Herzog | ............... C09J 7/0282 428/40.1 |
| 2012/0008250 A1 | | 1/2012 | Ichikawa et al. | |

OTHER PUBLICATIONS

Yuan et al., "Cross-linking effect on dielectric properties of polypropylene thin films and applications in electric energy storage," Applied Physics Letters 98, 2011, 062901-1-062901-3.

Chung, T.C. Mike, "Functionalization of Polypropylene with High Dielectric Properties: Applications in Electric Energy Storage," Green and Sustainable Chemistry, 2012, vol. 2, 29-37.

Artbauer, J., "Electric Strength of Polymers," J. Phys. D: Appl. Phys., 29, 1996, 446-456.

\* cited by examiner

*Primary Examiner* — Ana Woodward
(74) *Attorney, Agent, or Firm* — Hovey Williams LLP

(57) ABSTRACT

New polymeric dielectric materials are provided for high power capacitors, especially for mobile and weapons applications. These materials utilize aminoplast crosslinking in their polymeric structure. The aminoplast crosslinking ability of these materials allows them to be customized for a number of applications, but also allows the materials to have a higher crosslinking density, leading to higher dielectric constants, higher breakdown voltage, and higher thermal stability. These materials can be incorporated into current capacitor manufacturing schemes with little to no processing changes.

24 Claims, 2 Drawing Sheets

HIGHLY CROSSLINKED POLYMER DIELECTRIC FILMS FOR IMPROVED CAPACITOR PERFORMANCE

RELATED APPLICATION

The present application claims the priority benefit of U.S. Provisional Patent Application Ser. No. 61/831,672, filed Jun. 6, 2013, entitled HIGHLY CROSSLINKED POLYMER DIELECTRIC FILMS FOR IMPROVED CAPACITOR PERFORMANCE, incorporated by reference in its entirety herein.

BACKGROUND OF THE INVENTION

Field of the Invention

The present invention is concerned with novel films that can be used as a dielectric layer in a capacitor.

Description of the Prior Art

When power is needed for time periods of minutes or more, batteries can deliver the needed stored power, or the power can be used as generated. However, when time frames are in the second to sub-second time frame, storage capacitors become important. Advanced technology applications such as directed energy weapons platforms typically need power bursts from a few milliseconds to sub-microseconds. All but a select few capacitor designs have difficulty supplying power in those time frames. These capacitors are known as pulsed power capacitors. Pulsed power capacitors operate at very high voltages, 10-100 kV, but with very little intrinsic energy, often in the nanofarad range or less. However, in the time frame needed they can deliver 1 megaAmp or more, depending on configuration. This is far more current than can be spontaneously generated in that time frame.

Pulsed power capacitors for directed energy weapons have specific needs. Because the intent is to use them for weapons platforms, the power systems need to be mobile. Additionally, delivering the power needed requires a lot of space. Currently, the capacitor bank needed to power a single rail gun is enormous. In addition to the shear volume of the capacitors, there is also a primary power generation unit, charging systems, switching units, pulse inductors, high current wiring, and cooling systems needed for the operation of the rail gun power system in addition to all the needed systems for the physical rail, targeting systems, round loading, and fire control. Other directed energy systems, such as the Air Force's airborne maser, laser, and EMP systems, have significantly greater limitations to volume and mass of the power supply and operational systems to maintain an airborne system. These tactical needs actually apply to all cases, weapons or other types, where the system is intended to be mobile. In cases where the power system is stationary, much of the need moves away from power/energy density and to reliability and response. Regardless of the application, working to reduce the volume and mass of the total system is critically important.

At high energy levels, a spontaneous uncontrolled discharge of even a single capacitor unit can have catastrophic consequences. A graceful failure mechanism is required. Therefore, capacitors of this type employ what is known as "self-clearing" attributes. When there is a failure, typically a voltage breakdown, a corona release, or an electrical short between the plates, the energy released is sufficient to heat the "defect" site to vaporization. This means the complete vaporization of the metal plates, the dielectric film, and the defect generator takes place. The result is a small clear hole with a corresponding reduction in the area of the plates, but a capacitor that continues to work with a slight reduction of energy capacity. A capacitor is considered damaged and needs to be replaced when the stored energy is reduced by 5% of the original capacity.

The current state of the art of films for polymer dielectric separators in high power capacitors suffers from low dielectric constants, energy loss, low breakdown voltages, thermal instability, high-char yields from internal discharge events, and/or combinations of these issues. Improvement in the energy and power density of the capacitors can be accomplished by the increase in the dielectric constant of the film. A larger dielectric constant film allows for more electrons, and thus more energy to be stored onto the plates with the same voltage across the plates. Organic polymers typically have dielectric constants between 2 and 10. Some extreme examples can be found as high as 50. Inorganic types of insulators can have dielectric constants as high as 50,000. However, there is a trade-off to increasing the dielectric constant. First, as the dielectric constant goes up, the breakdown voltage typically decreases. The more polarizable the electrons in the material, the more likely conduction will occur from those electrons. Typically, the more polarizable the materials, the longer it takes for the induced dipole in the dielectric to relax and give the full power of the capacitor. For pulsed power applications, if relaxation is too slow, insufficient power is generated or the polarization of the capacitor can temporarily reverse. Lastly, the higher the dielectric constant the more the dielectric constant changes with respect to temperature. This is especially true for polymeric materials that generate much of their dielectric constant from their morphology.

The breakdown voltage of an insulating material is the minimum voltage that causes the material to become conductive. In a capacitor, the higher the voltage that can be applied across a film, the higher the resulting power output. A higher voltage that can be applied per unit thickness also generates more power per unit space. Thus, a higher breakdown voltage leads to higher power density. Currently the highest known breakdown voltage material is biaxially-oriented polypropylene (BOPP), with a breakdown voltage of 900 V/$\mu$m. This high breakdown voltage has placed BOPP as the market leader for mobile, pulsed power capacitor dielectrics and as a major player in other markets. However, BOPP only has a dielectric constant of 2. So, it can store a large amount of voltage for power delivery, but not as much energy.

BOPP has another property that has made it one of the materials of choice for pulsed power capacitors. It doesn't leave any char upon pyrolysis. When there is a defect and an internal discharge event, the polymer completely vaporizes and doesn't leave any conductive carbon material to further short the plates. This behavior is critical to the self-clearing effect. Many of the beneficial properties of BOPP are from the oriented morphology of the polymer. The film casting process aligns and stretches the polymer chains in the plane of the film. However, if the material reaches its Tg of about 105° C., the polymer chains relax, orientation is irreversibly lost, and the film shrinks, rendering the capacitor useless, and resulting in catastrophic failure if the capacitor is energized.

Polymer dielectrics that maintain performance criteria over a wider range of temperatures are desirable, because they require less thermal control systems. While this may not reduce the size of the specific capacitor used in an application, it may reduce the size of the ancillary cooling systems. Such reduction in overall systems will also help reduce the overall power system size, weight, and energy consumption. Many polymers can handle high temperatures, however, most of these polymers contain a large content of aromatic ring groups as part of the chemistry. This high degree of aromaticity often is what imparts the thermal stability to the polymer. Unfortunately, this aromaticity also impacts the self-clearing behavior of the polymer. When a polymer with a large content of aromatic groups is pyrolized through an internal discharge event, often there is residual carbonacious material. This material is a sufficient conductor of electricity to short circuit the capacitor plates, rendering the whole of the capacitor irreparably damaged. Improving dielectric material properties such as the dielectric constant, breakdown voltage, and thermal stability in materials through densification, utilization of materials not reliant on morphology, and/or locking in the morphology with crosslinking can improve the material aspect of the dielectric.

SUMMARY OF THE INVENTION

The present invention overcomes the problems of the prior art by broadly providing a method of forming a dielectric film. The method comprises providing a composition comprising an aminoplast dispersed or dissolved in a solvent system and forming the composition into a free-standing dielectric film.

The invention also provides a dielectric film comprising a crosslinked aminoplast, where the film is dense and highly crosslinked, and is also free-standing.

In a further embodiment, the invention is concerned with a layered structure comprising a first dielectric film comprising a highly crosslinked aminoplast, where the film has first and second sides. There is a first conductive layer adjacent the first side of the first dielectric film, and a second conductive layer adjacent the second side of the first dielectric film.

In yet another embodiment, the invention provides a capacitor comprising a layered structure. The layered structure comprises a first dielectric film comprising a highly crosslinked aminoplast, where the film has first and second sides. There is a first conductive layer adjacent the first side of the first dielectric film, and a second conductive layer adjacent the second side of the first dielectric film.

DETAILED DESCRIPTION OF THE PREFERRED EMBODIMENTS

Figure 1:
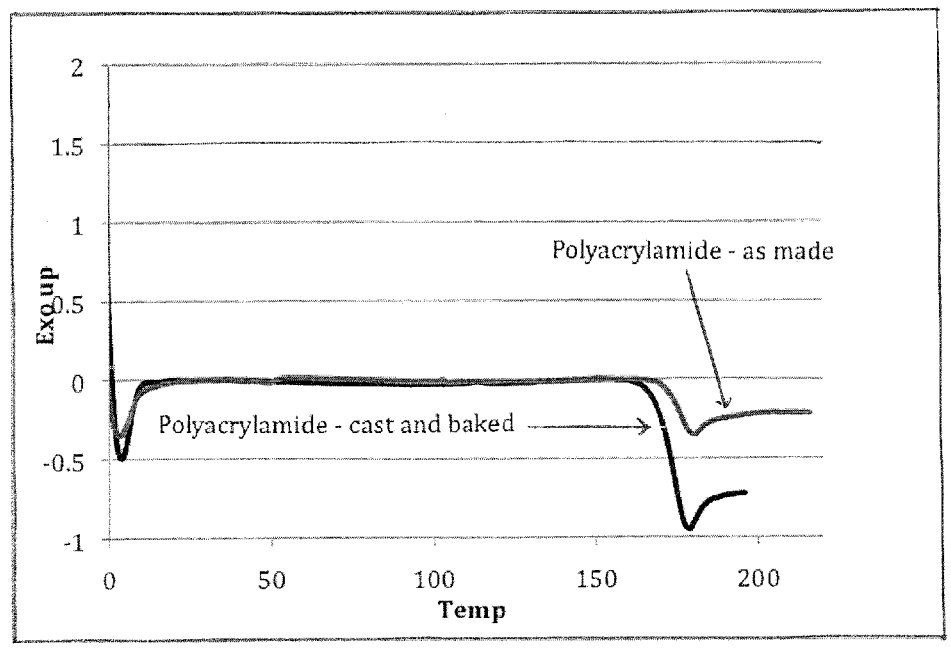
FIG. 1 shows the results of differential scanning calorimetry of the polyacrylamide polymer prepared in Example 2, and the cast film prepared in Example 4.

The present invention is broadly concerned with providing dense, highly-crosslinked dielectric films that are particularly useful in capacitors, such as pulsed power capacitors. The films are formed from a composition that comprises an aminoplast (or aminoplasts) dispersed or dissolved in a solvent system.

Preferred aminoplasts are selected from the group consisting of ureas (including thioureas), glycolurils, melamines (including functionalized melamines), amides (including polyamides) functionalized with formaldehyde (including formaldehyde equivalents, blocked formaldehyde equivalents, and protected formaldehyde equivalents), polymers of the foregoing (i.e., polymerized aminoplasts are suitable, as are oligomeric aminoplasts), and mixtures of the foregoing.

Particularly preferred aminoplasts comprise a structure selected from the group consisting of

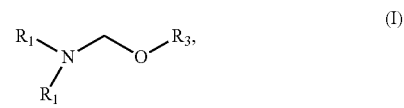

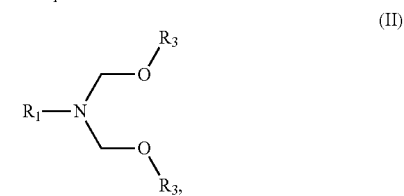

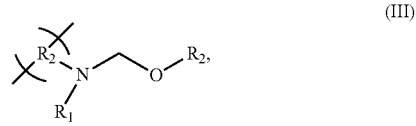

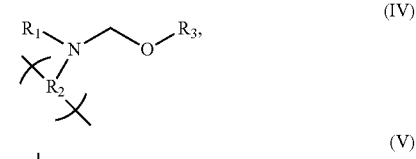

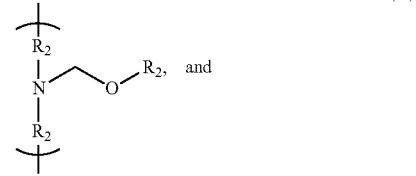

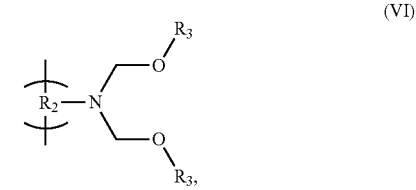

wherein:
each $R_1$ is individually selected from the group consisting of —H, alkyls (preferably $C_1$-$C_{12}$, and more preferably $C_1$-$C_6$), ringed moieties, —C=O, and polymer chains;
each $R_2$ is individually selected from the group consisting of divalent alkyls (preferably $C_1$-$C_{12}$, and more preferably $C_1$-$C_6$), ringed moieties, —C—O—, and polymer chains; and
each $R_3$ is individually selected from the group consisting of —H and alkyls (preferably $C_1$-$C_{12}$, and more preferably $C_1$-$C_6$).

Examples of suitable ringed moieties for use as $R_1$ or $R_2$ include those selected from the group consisting of aromatic rings (e.g., triazines, phenols, phenyls) and non-aromatic alkyl rings (i.e., cyclic aliphatic moieties or aliphatic rings, such as glycourils). In a particularly preferred embodiment, the aminoplasts are substantially free of aromatic groups (i.e., there are less than about 1% and preferably about 0% by weight aromatic groups, based upon the total weight of the aminoplasts in the composition taken as 100% by weight).

Preferred polymer chains for use as $R_1$ or $R_2$ include those that include functional groups that are reactive with the above aminoplasts. Examples of such functional groups include those selected from the group consisting of amides, alcohols, phenols, thiols, amines, ureas, urethanes, thioureas, thiourethanes, malimides, and imides.

As indicated the (I)-(VI) above, the aminoplast can be provided in monomeric, oligomeric, or polymeric form. For example, the utilized aminoplast could be a polymer that includes melamines as a recurring monomer, either alone or as a comonomer. Additionally, the aminoplast could be part of the repetitive structure of a polymer such as N-((isobutoxy)methyl)acrylamide. In one embodiment, the aminoplast comprises a structure selected from the group consisting of (III), (IV), (V), and (VI), and further comprises at least one comonomer along with the structure. Such systems provide a platform whereby polymer films are created and then crosslinked to dense polymer films. In instances where the aminoplast is provided as a polymer, typical weight average molecular weights would be from about 500 Daltons to about 100,000 Daltons, preferably from about 5,000 Daltons to about 50,000 Daltons, and more preferably from about 15,000 Daltons to about 30,000 Daltons.

The aminoplast is preferably included in the composition at levels of from about 25% to about 100% by weight, more preferably from about 35% to about 100% by weight, and even more preferably from about 50% to about 95% by weight, based upon the total weight of the composition taken as 100% by weight.

The use of aminoplast crosslinking systems has many advantages. Many polymers naturally contain functional groups (such as those listed above) amenable to aminoplast crosslinking. This allows a wide range of starting materials to be used to meet specific performance criteria. Such a large selection of monomers with aminoplast-crosslinkable functional groups allows many polymers and copolymers to be used.

The solvent system for use to form the aminoplast composition includes any solvent in which the aminoplast can be dissolved or dispersed. Suitable solvents include those selected from the group consisting of propylene glycol monomethyl ether, propylene glycol monomethyl ether acetate, gamma-butyrolactone, cyclohexanone, cyclopentanone, ethyl lactate, ethylacetoacetate, n-butyl acetate, methyl isobutyl carbinol, 2-heptanone, isopropyl alcohol, methyl ethyl ketone, and mixtures thereof. The solvent system is preferably included in the composition at levels of from about 0% to about 70% by weight, more preferably from about 0% to about 50% by weight, and even more preferably from about 5% to about 25% by weight, based upon the total weight of the composition taken as 100% by weight.

The composition preferably further comprises a catalyst to accelerate the crosslinking reaction, although the reaction will occur without a catalyst present, so the composition can also be substantially free or completely free of a catalyst. Preferred catalysts will be an acid catalyst, and preferably a strong acid. Suitable such catalysts include those selected from the group consisting of sulfuric acid, sulfonic acids, and mineral acids. Although strong acids are typically preferred, weak acids can also be utilized, such as those selected from the group consisting of phosphoric acid, acetic acid, benzoic acid, and other carboxylic acids. When a catalyst is utilized, it is preferably included in the composition at levels of from about 0.1% to about 2% by weight, more preferably from about 0.1% to about 1% by weight, and even more preferably from about 0.1% to about 0.5% by weight, based upon the total weight of the aminoplast(s) in the composition taken as 100% by weight.

The composition preferably consists essentially of, or even consists of, the above aminoplast(s) in a solvent system, either with or without a catalyst. However, in alternative embodiments, a number of other ingredients could be utilized, including those selected from the group consisting of other polymer, surfactants, and rheology modifiers.

In instances where another polymer (i.e., not an aminoplast) is utilized with the aminoplast component, suitable polymers include those selected from the group consisting of polyamides, polyimides, polyethers, polyurethanes, epoxy polymers, and polyesters. In instances where another polymer is used with the aminoplast component, that other polymer is preferably included in the composition at levels of from about 1% to about 75% by weight, more preferably from about 10% to about 50% by weight, and even more preferably from about 20% to about 40% by weight, based upon the total weight of the aminoplast(s) in the composition taken as 100% by weight. But in other embodiments, the compositions are substantially free of polymers other than the aminoplast component (regardless of the form in which the aminoplast component is provided). That is, polymers that are not aminoplasts are present at levels of less than about 2%, preferably less than about 1%, and more preferably about 0%, based upon the total weight of the composition taken as 100% by weight.

The composition is prepared by simply mixing the above ingredients together so as to dissolve or disperse the solids in the solvent system. The composition can then be subjected to any number of conventional film-forming processes, including those selected from the group consisting of spin coating, melt extrusion, draw bar forming, or bubble molding. In instances where spin coating or draw bar forming is utilized, the composition is applied to a substrate by either spin-applying the composition to form a layer of the composition on the substrate (i.e., spin coating), or by simply applying the composition to the substrate and drawing it with a bar to form a layer of the composition on the substrate (i.e., draw bar forming).

After the substantially uniform layer of composition is formed, that layer is then crosslinked to form a crosslinked film. The act of simply heating the film to remove the solvent (e.g., to a temperature of from about 50° C. to about 250° C., and preferably from about 100° C. to about 200° C.), or to melt process, if that process is utilized, will activate the aminoplast crosslinking with or without the acid catalyst. Since there is traditionally a thermal process associated with the formation of films, no added step is required in the production of the inventive aminoplast-crosslinked films for capacitor dielectrics. Regardless, the crosslinking of the composition forms a dense and highly crosslinked dielectric film. If the film was formed on a substrate (such as during spin coating), that dense/compacted and highly crosslinked film is then removed from the substrate to yield a free-standing (i.e., unsupported) dielectric film.

The resulting crosslinked films exhibit a number of desirable properties. For example, these films have a high dielectric constant. The dielectric constant is preferably at least about 2, more preferably from about 2 to about 6, and even more preferably from about 4 to about 8. The films also exhibit the property of having a very stable dielectric strength over a wide range of temperatures. For example, when subjected to the high potential testing described in Example 8, the % change in dielectric strength will be less than about 20%, preferably less than about 15%, and more preferably less than about 10%. Additionally, the inventive films do not create char when they are discharged. This is extremely important because any char that is created would otherwise create a short between the two metals or electrodes of the final capacitor. One can verify that char has not been created by applying potential to the capacitor after a first discharge and verifying that the second discharge occurs at about the same potential as the first discharge. If char has occurred, the second discharge will occur at a potential that is reduced from the first discharge by at least about 50%.

The inventive crosslinked films have several advantages over the non-crosslinked films of the same polymer or monomer type. The crosslinking reaction chemically links individual polymer chains or monomers to other chains or monomers in the matrix, which inhibits polymer chain or monomer motion relative to other polymer chains or monomers. The result is the inhibition of the glass transition. That is, dielectric films prepared according to the invention will exhibit no measurable glass transition temperature ($T_g$). Without the glass transition or other free motion of the polymer chains, the overall film remains dimensionally stable through a broader range of temperatures than without crosslinking. There is no polymer chain movement, no relaxation of morphology, no annealing, and no flow of the film. Once the film is formed, it is stable until chemical degradation processes occur. The crosslinked films can be used at elevated temperatures where the non-crosslinked films would have undergone a thermal transition and had their properties decline.

Another advantage of highly crosslinked films for polymer film dielectrics results from the polymer densification. All amorphous polymers contain empty space between chains as "free volume." The empty space results in a polymer film that can allow for diffusion of gas, solvent, or other small molecules through what physically appears to be a solid material. In the dielectric films used in capacitors, this free volume is detrimental to the properties of the film. The empty space has a very low dielectric constant (vacuum is 1 and air is 1.0056) that becomes part of the average for the whole film. Further, this empty space makes the polymer matrix more susceptible to the "electron cascade effect" for voltage breakdown. In this effect, an electron is released from the metal plate into the dielectric film. The field of the capacitor accelerates the electron in the direction of the other plate. Along the way, the electron impacts atoms in the dielectric material between the plates. The further the electrons have moved before striking the atoms, the more energy they impart in the impact due to the acceleration. In the empty free volume of the polymer film there is more space to travel, so it is more likely that a high-energy impact event will release more electrons, repeating the acceleration, impact, and electron release. As the numbers of electrons grow and are accelerated in the field, conduction occurs, and there is a voltage breakdown and discharge. The resulting discharge can lead to an electric arc or corona event, damaging the capacitor. With the tight and dense crosslinking of the inventive polymer chain, free volume is reduced since the crosslinking density increases and pulls the polymer chains closer together.

Increasing crosslink density also provides a mechanism to impart dimensional stability to the polymer film over a larger temperature range. This allows for a wider operation temperature of the capacitors for a given type of film. The increased crosslink density also decreases free volume, improving the dielectric constant and increasing the breakdown voltage. Both of these increase the energy density of capacitor.

As noted above, the inventive film can then be used to form a capacitor, using conventional capacitor-forming techniques. The film is placed between two conductive layers (e.g., a metal layer), as is conventionally done with dielectric films. Furthermore, a second film according to the invention can be including adjacent one of the conductive layers so that a multi-layered structure comprising a first conductive layer, a first dielectric film, a second conductive layer, and a second dielectric film is formed. Regardless of the number of layers, the layered structure is formed into a coil that is used for the final capacitor.

EXAMPLES

The following examples set forth preferred methods in accordance with the invention. It is to be understood, however, that these examples are provided by way of illustration and nothing therein should be taken as a limitation upon the overall scope of the invention.

Example 1

Synthesis of
Poly(N-((iso-Butoxy)Methyl)Acrylamide)

A 1-liter, round bottom flask was charged with 150.18 grams of N-((iso-butoxy)methyl)acrylamide (NIBMA, Aldrich, St. Louis, Mo.), 3.17 grams of azo-bis(isobutylnitrile) (AIBN, Aldrich, St. Louis, Mo.), and 600.3 grams of tetrahydrofuran (THF, Aldrich, St. Louis, Mo.). The round bottom flask was fitted with a water-cooled condenser and a nitrogen line with a static pressure bubbler. The reactor vessel was purged with an active flow $N_2$ for 10 minutes. The $N_2$ was then changed to a static blanket, and the reaction vessel was placed in a preheated silicon oil bath heated to 80° C. The reaction was allowed to reflux for 16 hours. After cooling to room temperature, the resulting polymer solution was precipitated into a 7-fold excess of hexanes (Aldrich, St. Louis, Mo.). The polymer precipitate was filtered by vacuum filtration and dried under vacuum at 40° C. for 16 hours. The structure of the obtained polymer (PNIBMA) is shown below.

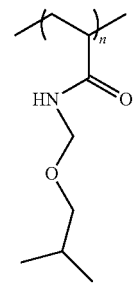

Example 2

Synthesis of Polyacrylamide

Comparative Example

A 100-ml round bottom flask was charged with 4.97 grams of acrylamide (Aldrich, St. Louis, Mo.), 0.12 gram of AIBN, and 45.00 grams of THF. The round bottom flask was fitted with a water-cooled condenser and a nitrogen line with a static pressure bubbler. The reactor vessel was purged with an active flow $N_2$ for 10 minutes. The $N_2$ was then changed to a static blanket. The reaction vessel was placed in a preheated silicon oil bath heated to 80° C. The reaction was allowed to reflux for 16 hours. During the course of the polymerization, the polyacrylamide polymer precipitated from the THF solution. A tier cooling to room temperature, the resulting polymer slurry was filtered by vacuum filtration and dried under vacuum at 40° C. for 16 hours. The structure of the polyacrylamide is shown below.

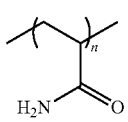

Example 3

Formulation of Polyacrylamide for Spin Coating

In this procedure, 0.0110 gram of p-toluenesulfonic acid (pTSA, Aldrich, St. Louis, Mo.) and 12.28 grams of DI water were added to 3.08 grams of polyacrylamide. The solution was thoroughly mixed until the polymer dissolved. The final solution was filtered through a 45-mm diameter, 0.45-µm pore nylon disk filter fitted to a syringe.

Example 4

Spin Coating Polyacrylamide

About 2 milliliters of the solution prepared in Example 3 was placed on a 100-mm diameter silicon wafer. The wafer was spun on a spin and bake tool (sold under the name Cee® 100 by Brewer Science, Inc., Rolla, Mo.) at 1,000 rpm for 60 seconds. The wafer was then placed onto the hotplate of the tool at 205° C. for 60 seconds. The resulting film was measured to be 2.03 µm thick using a prism coupler (sold under the name Metricon Model 2010 by Metricon Corp, Pennington, N.J.).

Example 5

Formulation of PNIBMA

In this Example, 13.03 grams of propylene glycol monomethyl ether (PGME, Harcross) and 0.0142 gram of pTSA were added to 2.64 grams of poly(N-((iso-butoxy)methyl)acrylamide) synthesized in Example 1. The solution was thoroughly mixed until complete dissolution was achieved. The final solution was filtered through a 45-mm diameter, 0.20-µm pore polytetrafluoroethylene (PTFE) disk filter fitted to a syringe.

Example 6

Spin Coating of PNIBMA

About 2 milliliters of the solution prepared in Example 5 was placed on a 100-mm diameter silicon wafer. The wafer was spun in a Cee® 100 spin and bake tool at 1,000 rpm for 60 seconds. The wafer was then placed on the hotplate of the tool at 205° C. for 60 seconds. The resulting film was measured to be 0.83 µm thick using a Metricon Model 2010 prism coupler. The resulting films were stable to a puddle of PGME on the wafer for 5 minutes without change, demonstrating the crosslinked nature of the film.

Example 7

Differential Scanning Calorimetry of Materials

Figure 2:
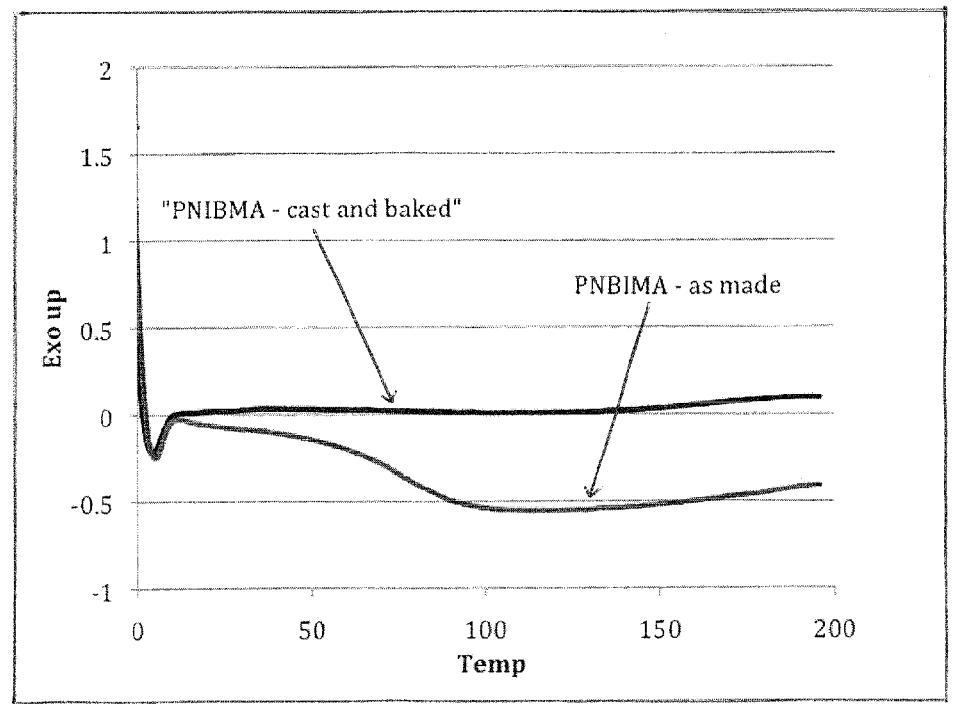
FIG. 2 shows the results of differential scanning calorimetry of the PNIBMA polymer prepared in Example 1, and the cast film prepared in Example 5.

Differential scanning calorimetry (DSC) was preformed on the polymers created in Examples 1 and 2 and on the films created in Examples 4 and 6 (TA instruments DSC 2920 modulated DSC using thermal advantage software ver. 1.1A). DSC on the spun cast films was performed by physically scraping the film from the silicon wafer. The samples were run at a 10° C./min ramp rate between 0° C. and 220° C. in a heat-cool-heat cycle. The data was processed using TA instruments Universal Analysis 2000 ver 3.1E. The Tg of the polyacrylamide did not change from the pure polymer of Example 2 and the film of Example 4, as shown in FIG. 1, indicating that the polymer was effectively unchanged by the casting and baking process. However, the pure polymer in Example 1 and the film in Example 6 showed a dramatic change in Tg. The pure polymer had a Tg of 75° C., and the cast and cured film did not have an observable Tg, as shown in FIG. 2.

Example 8

High Potential Testing

Figure 3:
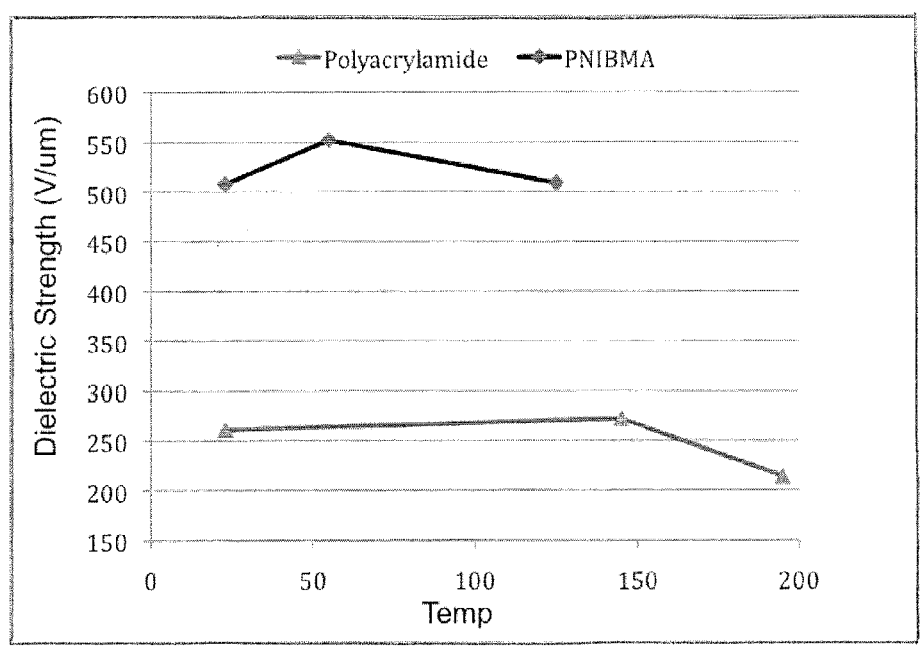
FIG. 3 displays the breakdown voltage of cast films of polyacrylamide and PNIBMA through a temperature ramp.

The wafers coated in Examples 4 and 6 were subjected to high potential testing (Hipot) to measure the breakdown voltage of the film. Coated, highly p-doped silicon wafers were placed on a grounded aluminum plate as a substrate with the coated side up exposed to the air. A positive connection was made to the film by way of a round tip steel probe kept in place by a plastic plate. A potential was applied by a Sentry 30 Plus AC/DC/IR Hipot tester (Quadtech, Maynard, Mass.) at 100 V/sec ramp until an arc discharge event was sensed. Each sample was tested in 13 different locations on three different wafers. The resulting breakdown voltage was taken as the average result. The same procedure was repeated at elevated temperatures by placing the aluminum ground plate on a thermostatically controlled hot plate to measure the change as the samples passed the pure polymer Tg. The results are shown in FIG. 3.

Example 9

Formulation of PNIBMA for Draw Bar Film Formation

In this procedure, 13.63 grams of PGME were added to 9.09 grams of the PNIBMA from Example 1. The solution was mixed thoroughly. Once complete dissolution occurred, 0.0495 grams (0.5% wt/wt) of pTSA was added, and the sample was mixed once more. The final solution was filtered through a 45-mm diameter, 0.20-µm pore PTFE disk filter fitted to a syringe.

Example 10

Draw Bar Film Forming

A sample of the formulation created in Example 9 was placed on a 20-mil thick, PTFE film that was taped to a glass pane. The solution was drawn using a 0.020-inch wire-wrapped bar, leaving a wet film on the EFP. The glass slide was then moved to a 200° C. hot plate where it was baked for 5 minutes. The resultant clear, dry, uniform film was peeled from the PTFE and was measured with digital calipers at a thickness of 0.010 mm (10 μm).

I claim:

1. A method of forming a dielectric film, said method comprising:
    providing a composition comprising an aminoplast dispersed or dissolved in a solvent system, wherein said aminoplast is present in said composition in an amount from 35% to about 95% by weight, based upon the total weight of said composition taken as 100% by weight; and
    forming said composition into a free-standing dielectric film.

2. The method of claim 1, wherein said aminoplast is selected from the group consisting of ureas, glycolurils, melamines, amides functionalized with formaldehyde, polymers of the foregoing, and mixtures of the foregoing.

3. The method of claim 1, wherein said aminoplast comprises a structure selected from the group consisting of

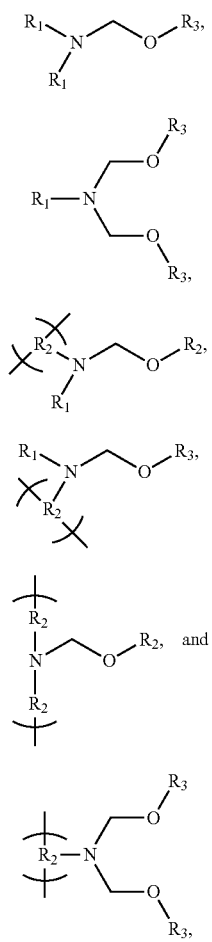

wherein:
each $R_1$ is individually selected from the group consisting of —H, alkyls, ringed moieties, —C=O, and polymer chains;

each $R_2$ is individually selected from the group consisting of ringed moieties and polymer chains; and each $R_3$ is individually selected from the group consisting of —H and alkyls.

4. The method of claim 3, wherein said aminoplast comprises a structure selected from the group consisting of (III), (IV), (V), and (VI), and at least one other comonomer unit.

5. The method of claim 1, said composition further comprising an acid catalyst.

6. The method of claim 1, wherein said forming comprises subjecting said composition to a process selected from the group consisting of spin coating, melt extrusion, draw bar forming, and bubble molding.

7. The method of claim 6, wherein said forming comprises:
    applying said composition to a substrate by a process selected from the group consisting of:
    spin-applying said composition to a substrate to form a layer of said composition on said substrate; and
    applying said composition to a substrate and drawing said composition with a bar to form a layer of the composition on the substrate;
    crosslinking said layer to form a crosslinked film; and
    removing said crosslinked film from said substrate to yield said free-standing dielectric film.

8. The method of claim 1, wherein said forming includes crosslinking a layer of said composition so as to form a dense and highly crosslinked dielectric film.

9. The method of claim 8, wherein said film exhibits no measurable $T_g$.

10. The method of claim 8, wherein said film, when subjected to high potential testing, exhibits a % change in dielectric strength of less than about 20% up to 150° C.

11. The method of claim 8, wherein said film does not create char when discharged.

12. The method of claim 1, wherein said composition is substantially free of polymers other than the aminoplast.

13. The method of claim 1, wherein said composition further comprises a polymer that is not an aminoplast.

14. The method of claim 1, wherein said aminoplast is present in said composition in an amount from about 50% to about 95% by weight, based upon the total weight of said composition taken as 100% by weight.

15. A dielectric film comprising a crosslinked aminoplast, said film being a dense and highly crosslinked film, and said film further being free-standing, wherein said film is formed from a composition comprising from 35% to about 95% by weight of said aminoplast, based upon the total weight of said composition taken as 100% by weight.

16. The film of claim 15, wherein said aminoplast is selected from the group consisting of ureas, glycolurils, melamines, amides functionalized with formaldehyde, polymers of the foregoing, and mixtures of the foregoing.

17. The film of claim 15, wherein said aminoplast comprises a structure selected from the group consisting of

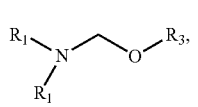

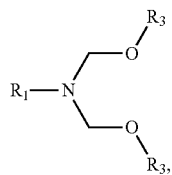

(II)

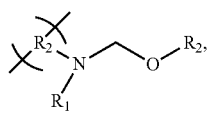

(III)

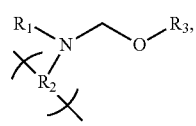

(IV)

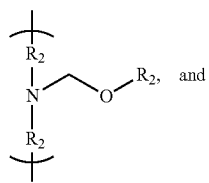

(V)

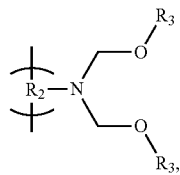

(VI)

wherein:
each R is individually selected from the group consisting of —H, alkyls, ringed moieties, —C=O, and polymer chains;
each $R_2$ is individually selected from the group consisting of ringed moieties and polymer chains; and
each R3 is individually selected from the group consisting of —H and alkyls.

18. The film of claim 17, wherein said aminoplast comprises a structure selected from the group consisting of (III), (IV), (V), and (VI), and at least one other comonomer unit.

19. The film of claim 15, wherein said film is substantially free of polymers other than the aminoplast.

20. The film of claim 15, wherein said film further comprises a polymer that is not an aminoplast.

21. The film of claim 15, wherein said film exhibits no measurable $T_g$.

22. The film of claim 15, wherein said film, when subjected to high potential testing, exhibits a % change in dielectric strength of less than about 20%.

23. The film of claim 15, wherein said film does not create char when discharged.

24. The film of claim 15, wherein said film is formed from a composition comprising from about 50% to about 95% by weight of said aminoplast, based upon the total weight of said composition taken as 100% by weight.

* * * * *